(12) United States Patent
McCarty et al.

(10) Patent No.: US 8,057,556 B2
(45) Date of Patent: Nov. 15, 2011

(54) PROCESSING PAINT SLUDGE TO PRODUCE A COMBUSTIBLE FUEL PRODUCT

(75) Inventors: Joe McCarty, Clarkston, MI (US); Christopher Hubb, Belleville, MI (US); Kenneth O. Peebles, Fenton, MI (US)

(73) Assignee: Citibank, N.A., New York, NY (US)

( * ) Notice: Subject to any disclaimer, the term of this patent is extended or adjusted under 35 U.S.C. 154(b) by 578 days.

(21) Appl. No.: 12/018,426

(22) Filed: Jan. 23, 2008

(65) Prior Publication Data
US 2008/0184615 A1    Aug. 7, 2008

Related U.S. Application Data

(60) Provisional application No. 60/881,947, filed on Jan. 23, 2007.

(51) Int. Cl.
*C10L 1/00*        (2006.01)
*C10L 7/00*        (2006.01)

(52) U.S. Cl. ............................. 44/280; 44/620

(58) Field of Classification Search .................. 44/280, 44/620
See application file for complete search history.

(56) References Cited

U.S. PATENT DOCUMENTS

| | | | |
|---|---|---|---|
| 3,951,581 A | 4/1976 | Nakayama et al. | |
| 4,303,559 A | 12/1981 | Trost | |
| 4,423,688 A | 1/1984 | Kuo | |
| 4,426,936 A | 1/1984 | Kuo | |
| 4,436,037 A | 3/1984 | Kuo | |
| 4,750,274 A * | 6/1988 | Erdman et al. | 34/520 |
| 5,004,550 A | 4/1991 | Beckman et al. | |
| 5,160,628 A | 11/1992 | Gerace et al. | |
| 5,259,977 A | 11/1993 | Girovich et al. | |
| 5,269,234 A | 12/1993 | Powell | |
| 5,489,333 A | 2/1996 | Soroushian et al. | |
| 5,573,587 A | 11/1996 | St. Louis | |
| 5,765,293 A * | 6/1998 | St. Louis et al. | 34/305 |
| 6,119,607 A | 9/2000 | Guy et al. | |
| 6,248,140 B1 | 6/2001 | Genssler et al. | |
| 6,523,764 B2 | 2/2003 | Ueno et al. | |
| 6,673,322 B2 | 1/2004 | Santilli | |
| 6,729,565 B2 | 5/2004 | Yamakawa et al. | |
| 2006/0047177 A1 | 3/2006 | Forrester | |
| 2006/0070406 A1 | 4/2006 | Raichel et al. | |

FOREIGN PATENT DOCUMENTS

DE        3900482 C    *    2/1990

* cited by examiner

*Primary Examiner* — Cephia D Toomer
*Assistant Examiner* — Taiwo Oladapo
(74) *Attorney, Agent, or Firm* — Brinks Hofer Gilson & Lione

(57) ABSTRACT

A method for producing a combustion product that involves dewatering raw paint sludge from spray paint booth operations. The resulting material can provide significant and economical fuel value to combustion processes such as for power plants while also obviating the need to dispose of waste paint sludge in landfills. Additionally the process is inexpensive, safe and free of most problems associated with paint sludge drying.

20 Claims, 4 Drawing Sheets

PROCESSING PAINT SLUDGE TO PRODUCE A COMBUSTIBLE FUEL PRODUCT

TECHNICAL FIELD

The present invention relates generally to processing paint sludge. In particular, the present invention is directed to a method of producing a combustible fuel product from paint sludge which involves drying raw paint sludge from paint booth operations into a product that provides significant fuel value for combustion processes such as fuels used in power and heat generating plants and facilities.

BACKGROUND ART

Paint sludge poses a serious and expensive waste disposal problem for painting operations in manufacturing plants. When an object such as an automobile assembly or component is painted in a paint spray booth, the excess paint or overspray is typically collected in a water curtain and/or in a water stream underneath floor grating beneath the paint booth. This collected material is known as paint sludge. Disposing of paint sludge waste poses a problem of considerable complexity to paint booth operators. Current disposal technology is based upon incineration, or chemical and/or physical treatment together with solidification for purposes of landfill disposal. However, the disposal of paint sludge in landfills raises environmental concerns due to the fact that paint sludge typically contains numerous hazardous components. Such environmental concerns create the potential for long term liabilities and incur costs for special precautions that are needed to handle such waste materials.

Attempts have been made to create useful byproducts from paint sludge in order to gain or recover some value and lower the overall costs of processing the paint waste. Most of these attempts involved complex, potentially dangerous and problematic processing steps which add to the overall processing costs. Such high costs severely limit commercial interest in processing paint sludge.

U.S. Pat. No. 5,004,550 to Beckman et al. discloses a method for disposing of paint sludge that involves the addition of detackification agents to paint sludge in order to float the resulting product out of a paint sludge pit.

U.S. Pat. No. 5,160,628 to Gerace et al. discloses a method for making a filler from automotive paint sludge which involves a two-step process for handling paint sludge. In a first step Gerace et al. requires the mechanical removable of water from paint sludge. In the second step Gerace et al. uses chemical drying agents to remove further water and to produce a dried paint sludge powder containing uncured polymer.

U.S. Pat. No. 5,259,977 to Girovich et al. discloses a method and apparatus for the treatment of sewage sludge. Girovich et al teaches the desirability of an agglomerization or pelletization step in the treatment of organic sludge and discloses the use of quicklime in the treatment of organic sludge for the purposes of diminishing odors and neutralizing pathogens.

U.S. Pat. No. 5,489,333 to Soroushian et al. discloses the use of dried paint sludge powder as a filler admixed in Portland cement.

U.S. Pat. No. 5,573,587 to St. Louis discloses a method of paint sludge conversion that is used to produce building materials. St. Louis teaches pretreating paint sludge with sodium hydroxide before chemically drying the sludge.

U.S. Pat. No. 5,573,587 to St. Louis discloses mixing raw paint sludge with quicklime (CaO) to chemically dry the sludge and thereafter creating a powder of paint solids and slaked lime which is used as a component for use in mortar, cement, concrete and asphalt.

U.S. Pat. No. 6,673,322 to Santilli discloses a device for converting waste material into a fuel using a complex and potentially dangerous electric arc process to convert the molecular structure of these wastes into fuel.

Other patents that disclose various manners of processing paint sludge include U.S. Pat. No. 4,303,559 to Trost, U.S. Pat. No. 4,423,688 to Kuo, U.S. Pat. No. 4,426,936 to Kuo, U.S. Pat. No. 4,436,037 to Kuo and U.S. Pat. No. 6,119,607 to Guy et al.

Processing of paint sludge is time consuming and costly. Accordingly, there is need for a simple process that effectively collects and uses all of the paint sludge solids generated by paint booth facilities.

Landfill disposal of paint sludge is an environmentally undesirable method of disposing of waste paint sludge. Accordingly, there is a need for a better alternative method for disposal or recycling of waste paint sludge.

The present invention provides a simple and economic process for collecting, processing and using all of the paint sludge solids generated by paint booth facilities. Moreover, the present invention provides a method of producing a combustible fuel product from paint sludge which can be used to supplement fuel supplies used in power and heat generating plants and similar facilities and applications.

DISCLOSURE OF THE INVENTION

According to various features, characteristics and embodiments of the present invention which will become apparent as the description thereof proceeds, the present invention provides a process of producing a combustible fuel from paint sludge which involves the steps of:

a) obtaining raw paint sludge from a painting facility;

b) subjecting the raw paint sludge to a dewatering process to obtain a combustion fuel component that consists of a paint sludge having a solids content of up to about 50 weight percent; and c) mixing the combustion fuel component from step b) with carbonaceous material to produce a combustible fuel.

The present invention further provides a combustible fuel produced by:

a) obtaining raw paint sludge from a painting facility;

b) subjecting the raw paint sludge to a dewatering process to obtain a combustion fuel component that consists of a paint sludge having a solids content of up to about 50 weight percent; and c) mixing the combustion fuel component from step b) with carbonaceous material to produce a combustible fuel.

The present invention further provides a method of processing paint sludge which involves:

a) obtaining raw paint sludge from a painting facility;

b) subjecting the raw paint sludge to a dewatering process to obtain a combustion fuel component that consists of a paint sludge having a solids content of up to about 50 weight percent;

c) mixing the combustion fuel component from step b) with carbonaceous material to produce a combustible fuel; and d) combusting the combustible fuel.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to a method of producing a combustible fuel product from paint sludge which involves drying or dewatering raw paint sludge from paint booth operations into a product that provides significant fuel value for combustion processes such as fuels used in power and heat generating plants and similar facilities and application.

According to the present invention raw paint sludge from a painting operation is collected by separating the paint overspray particles from the spray booth water. The raw paint sludge is then subjected to a dewatering step in which a first portion of the water is removed to provide a concentrated sludge of up to about 50% solids or a concentrated sludge that has a caloric value of at least 5,000 Btu/lb. The dewatering step can involve mechanically draining water from the raw paint sludge or any process that removes excess water from the paint sludge. Examples of suitable dewatering processes include filtration, filter pressing, centrifugation, decantation, distillation, extraction, freeze drying, fluidized bed drying and similar processes that can be used to mechanically remove excess water from the raw paint sludge.

Removal of excess water by decantation offers a cost efficient manner of dewatering the raw paint sludge. According to the present invention, the decantation process can be enhanced by the addition of pressure, heat, chemical and/or vibration to the process to decrease the time required for decanting the paint sludge and/or to increase the percentage of paint solids in the dewatered sludge. As discussed below, the use of a filter media as a liner placed on top of a perforated plate in a decantation apparatus will keep the holes clean, thereby maintaining system performance while reducing maintenance cost. The collection of paint sludge and the dewatering step is common to all of the alternative embodiments of the present invention which are described below.

According to one embodiment of the present invention, the step of dewatering the raw sludge includes water chemistry treatment of paint particles in a spray booth water wash system for the decanting of the raw paint sludge. Any conventional chemical treatment can be used including floatation, sinking, emulsifying and/or electro-flotation.

After water chemistry treatment, the paint solids can be removed from the aqueous mixture by skimming, side stream, consolidation equipment, by clam shelling, (removing the paint sludge with a crane attached to a bucket) or any similar process that can adequately remove paint particles from the water wash system. Chemical treatment of the water wash system will allow for the separation and consolidation of the over spray paint particles into a paint sludge (raft) that can comprise 5 to 30 weight percent paint solids, 0 to 5 weight percent volatile organic compounds (VOC) and a remainder of water.

Figure 1:
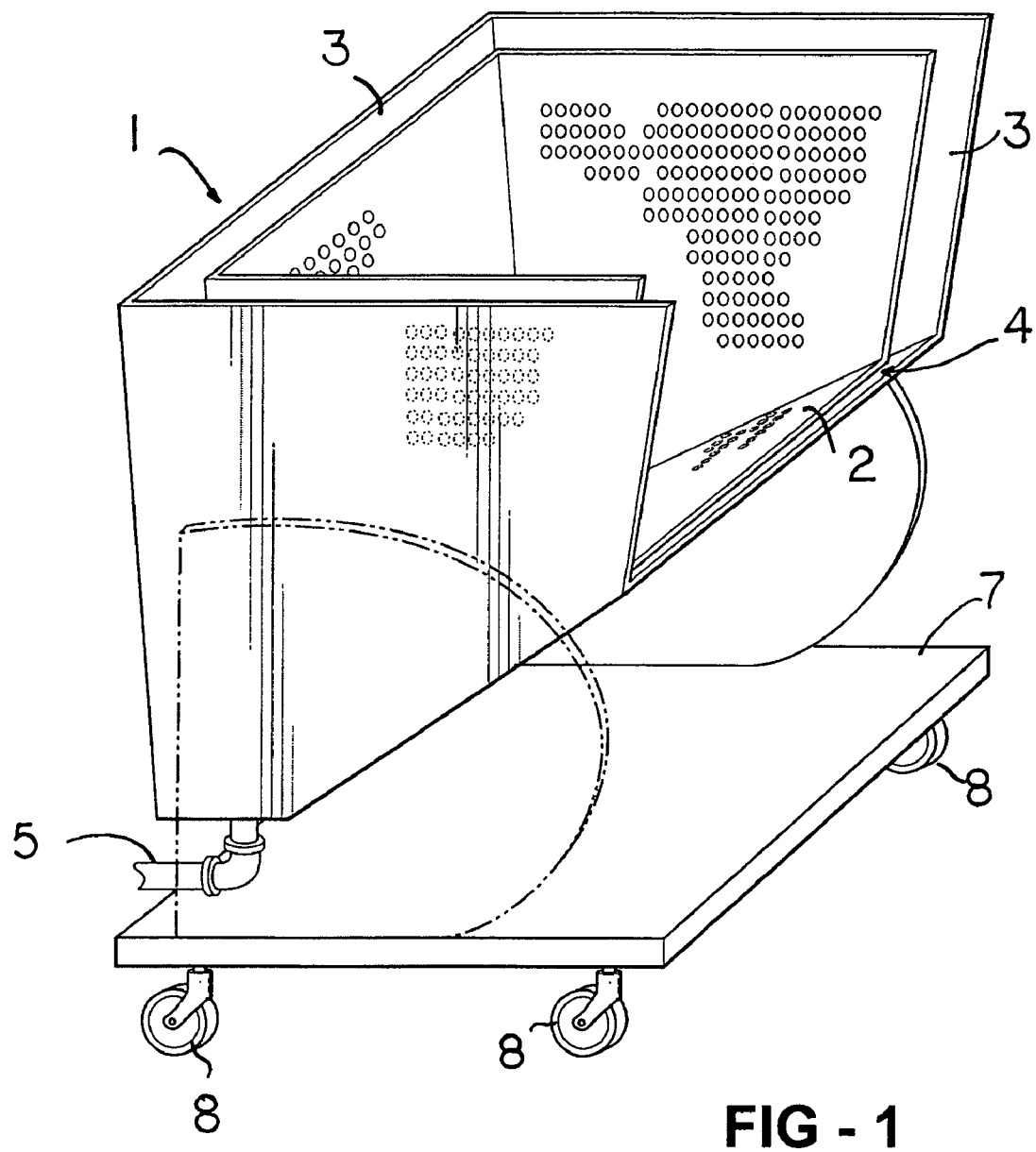
FIG. 1 is a perspective view of a self-tipping decanting hopper that can be used according to the present invention.
Figure 2:
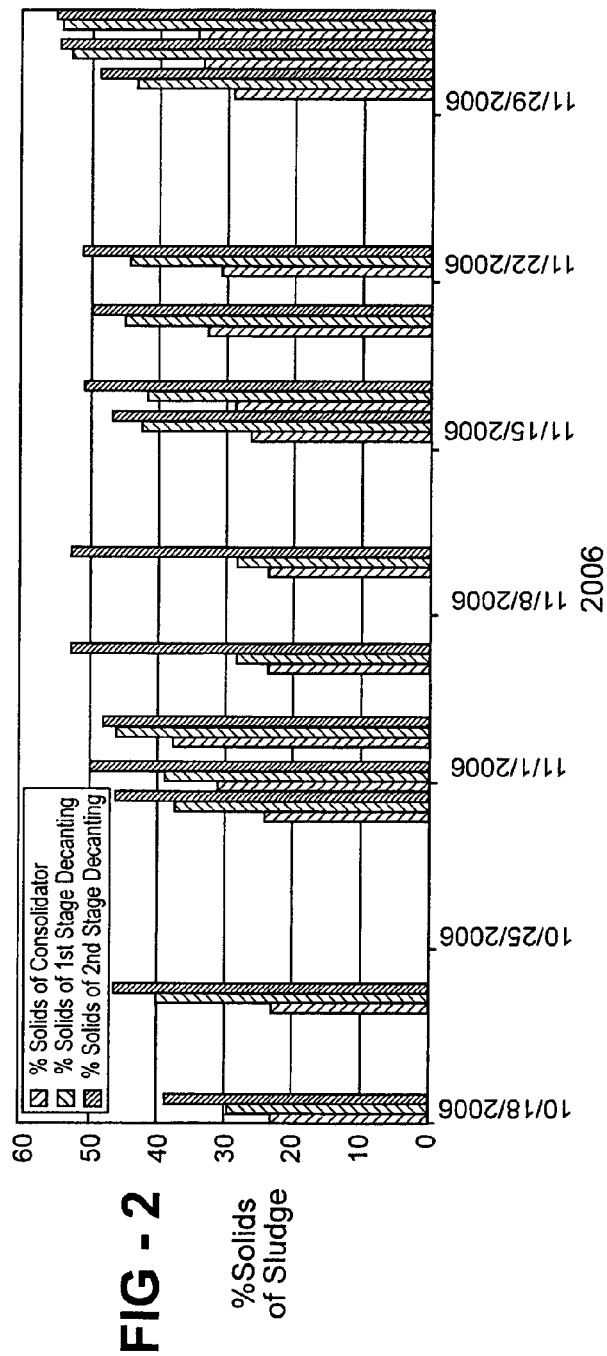
FIG. 2 is a bar graph that shows the solids percentage of sludge that was subjected to first and second stage decanting over a period of time.

Once the paint particles are consolidated and collected after the dewatering step they are placed in a decanting hopper for further water removal. FIG. 1 is a perspective view of a self-tipping decanting hopper that can be used according to the present invention. According to one embodiment the decanting hopper has a volume of 4-cubic yard and is made of carbon steel or any other suitable mechanically durable material. The decanting hopper 1 has a false floor 2 that is made from a perforated metal plate. According to one embodiment, the false floor comprises a layer of 14 gage carbon steel plate and has a plurality of ¼" diameter holes with centers that are spaced ⅜" apart with the centers arranged so that they are staggered at 60°. The false floor 2 is surrounded by the inner walls 3. The false floor 2 is attached to the inner walls 3 of the hopper 1 in such a manner, e.g. by supports such as 1"×1"×1" angle iron supports, so as to create a gap 4 between the inner walls 3 of the hopper 1 and the false floor 2. The supports can be welded to the inner walls 3 of the hopper 1 and the perforated plate, bolted therebetween or arranged or configured in any suitable manner using any convenient supports which provides the gap 4 between the inner walls 3 of the hopper 1 and the false floor 2. The perforated plate of the false floor 2 contains the paint solids while allowing water to pass therethrough. As noted above, the use of a filter media as a liner placed on top of a perforated plate of the false floor 2 will help keep the perforations from becoming plugged or blocked and thus help maintain system performance while reducing maintenance cost. Water is continuously removed through a drain 5 in the bottom of the hopper 1 which drain 5 is provided with a valve 6 (See FIG. 4). The removed water can either be returned to the spray booth water wash system, or sent to a waste water treatment facility for further processing. After a period of time (e.g., about 12 to 18 hours for a decanting hopper that has a volume of 4-cubic yard as described above) when very little water will continue to drain from the decanting system, the percentage of paint solids in the decanted sludge and the weight reduction are calculated. FIG. 2 is a bar graph that shows the solids percentage of sludge that was subjected to first and second stage decanting over a period of time.

During the course of the present invention it was determined that a single (the "first") stage of decanting may not produce a paint sludge that is consistent throughout. In this regard, the outer layer of the paint sludge was found to have released more water while the center portion of the paint sludge released relatively less water. The outer layer of the decanted paint sludge tends to trap the water in the inner layer so that only 35 to 50 weight percent paint solids can be achieved using a single (the "first") decanting stage alone.

In order to further increase water removal from the paint sludge, additional decanting stages can be used. According to the present invention it was determined that two or three decanting stages were generally sufficient to remove a desired amount of water. In order to perform successive multiple decanting stages, the paint sludge from the first stage decanting system is moved into a second stage system. The transfer of the sludge results in agitation that churns or mixes the sludge. This churning or mixing creates an improved and more homogenous consistency of paint sludge which promotes further release of water in the subsequent decanting stage. The second stage decanting system uses a decanting hopper that can be identical to the decanting hopper 1 used in the first stage decanting system described above. The second stage decanting can last up to approximately 12 to 18 hours (for a decanting hopper that has a volume of 4-cubic yard as described above) to drain enough water to obtain a paint sludge having greater than 45 weight percent solids. As shown, the decanting hopper 1 has a base 7 that is supported on wheels 8 so as to allow the decanting hopper 1 to be moved about as discussed below.

Figure 4:
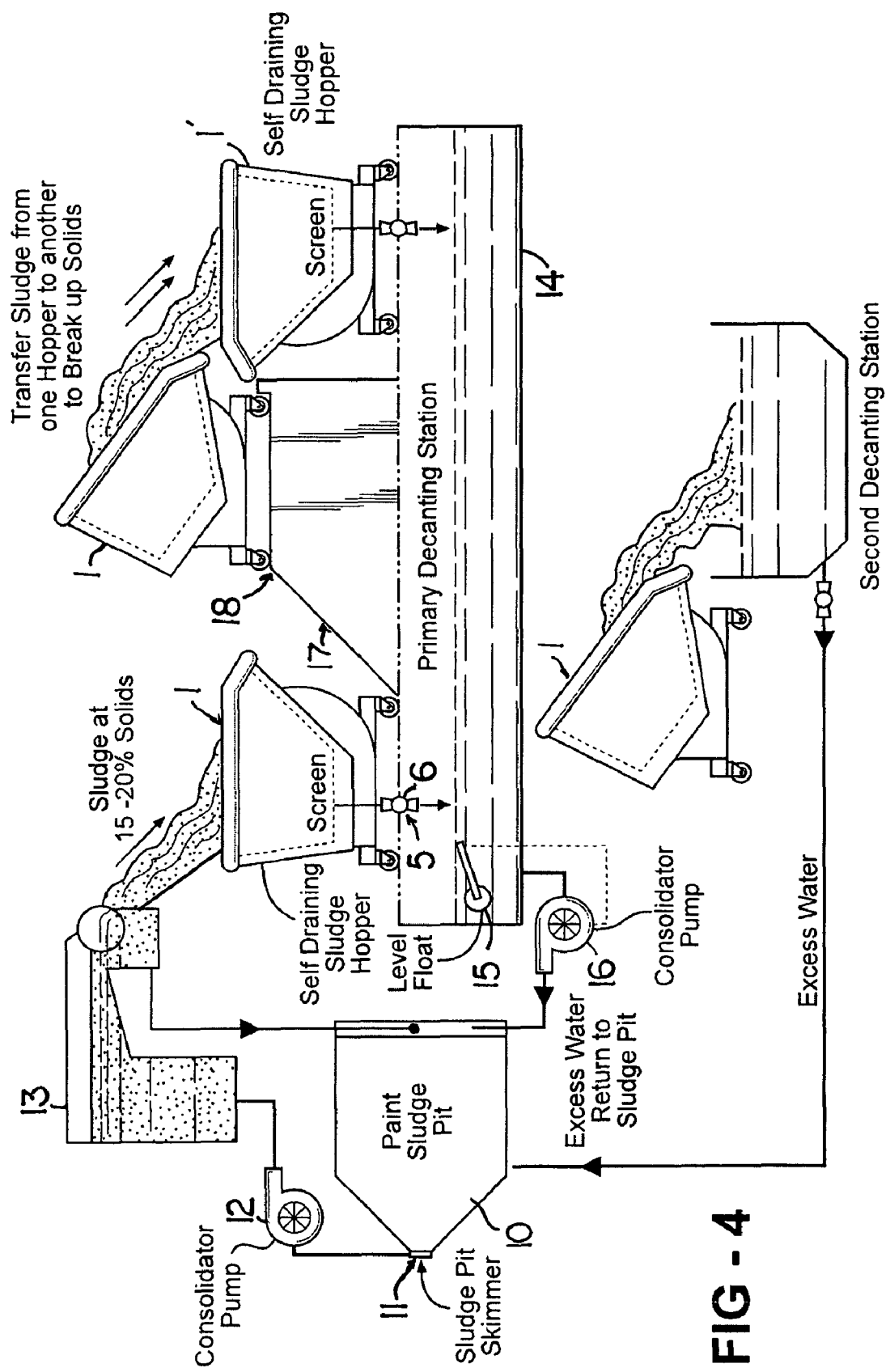
FIG. 4 is flow diagram of multiple decanting stages according to one embodiment of the present invention.

FIG. 4 is flow diagram of multiple decanting stages according to one embodiment of the present invention. FIG. 4 depicts how paint sludge from a paint sludge pit 10 is removed from the paint sludge pit 10 by a sludge pit skimmer 11 and pumped by a consolidator pump 12 to a receiving tank 13 whereat the paint sludge (typically having a solids content of about 15 to 20 weight percent) can be poured into decanting hopper 1 which is discussed above. The water from the paint sludge that drains beneath the false floor of decanting hopper 1 leaves through drain 5 and is received in a recovery tank 14 that is beneath decanting hopper 1. The recovery tank 14 can be provided with a level float 15 which can be used to control consolidator pump 16 which recycles recovered water for use in a paint booth associated with paint sludge pit 10.

FIG. 4 depicts how the self draining, decanting hoppers can be manipulated to discharge dewatered paint sludge from one decanting hopper into another. As shown a decanting hopper 1 containing dewatered paint sludge is rolled up an incline 17 to a platform 18 at which it is above a second decanting hopper 1' (or transport roll-off hopper 20 described below). In this position, the decanting hopper 1 is tipped so that the dewatered paint sludge therein is discharged into the lower, receiving decanting hopper 1' (or transport roll-off hopper 20). The tipping of the decanting hopper 1 can be effected by any conventional means such as a tip lever or cam mechanism/structure as are known in the art. As discussed above, when dewatered paint sludge is discharged from one decanting hopper to another the process helps break up and mix mass of dewatered paint sludge that has settled in the decanting hopper. This process exposes or provides water trapped in the center of the dewatered paint sludge an access to drain out of the previously settled mass. It is to be understood that while the self-tipping decanting hoppers are discussed herein as being particularly useful for purposes of the present invention, any type of decanting container/hopper can be used such as those which are not self-tipping.

FIG. 4 further depicts a secondary dewatering stage with decanting hopper 1, it being understood that further decanting/dewatering stages can be provided as desired.

The decanting stage can be repeated as many times as necessary to obtain a desired percentage of paint solids in the remaining sludge. Moreover, additional decanting stages can be used to guarantee the removal of any free liquids and to transport the paint solids to the energy production facilities so it can be used as a used as an alternative fuel.

Figure 5A:
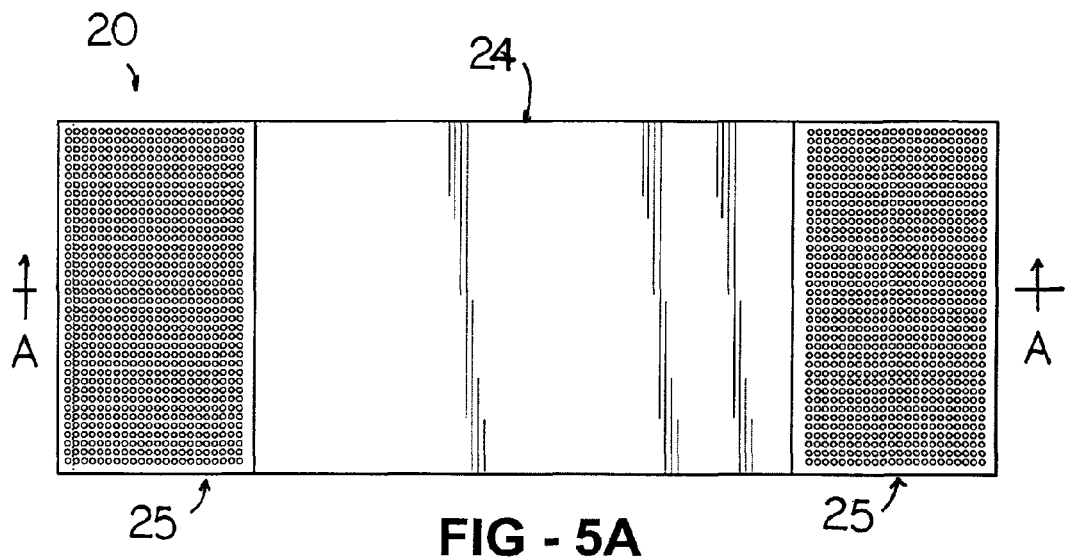
FIG. 5A is a top view of a roll-off hopper that can be used to transport recovered paint sludge according to the present invention.
Figure 5B:
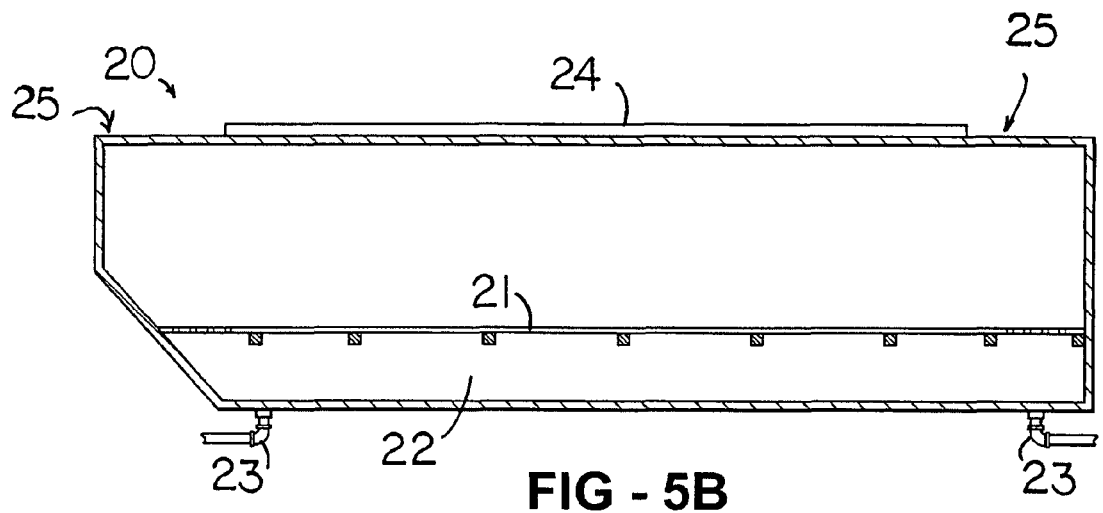
FIG. 5B is a cross-sectional view of the roll-off hopper of FIG. 5A taken along sectional lines A-A.

FIG. 5A is a top view of a roll-off hopper that can be used to transport recovered paint sludge according to the present invention. FIG. 5B is a cross-sectional view of the roll-off hopper of FIG. 5A taken along sectional lines A-A. The roll-off hopper 20 of FIGS. 5A and 5B is designed so it can be transported by truck empty, dropped off and staged at the decanting facility or system shown in FIG. 4. After the final dewatering stage, the processed paint sludge in the final decanting hopper can de dumped into roll-off hopper 20. Ideally roll-off hopper 20 has a large enough volume, e.g. 20 cubic yards or greater to receive the contents of several of the decanting hoppers which may have volumes of 4 cubic yards by example. Once the roll-off hopper 20 is fall of processed paint solids it can be picked up by truck and transported to a final destination such as a power plant.

As show in FIG. 5A and 5B, the roll-off hopper 20 includes a perforated false floor 21 which is perforated. Beneath the false floor 21 is a chamber 22 which can receive and contain any water that runs out of the paint sludge during transportation or loading of the roll-off hopper 20. The bottom of the roll-off hopper 20 is provided with one or more drains 23 which can be provided with valves (not shown) if desired. The top of the roll-off hopper 20 is shown as having a central cover 24 with openings 25 on either side thereof. The openings 25 can be used to load and unload processed paint into and from the roll-off hopper 20.

It has been determined during the course of the present invention that paint sludge with a percentage of solids greater than 45 weight percent will pass EPA method 9095B paint filter test. This test method is used to determine the presence of free liquids in the decanted paint sludge. As a result of passing this test, the present inventor has determined that the paint sludge can be used as a recovered recycled fuel product.

Figure 3:
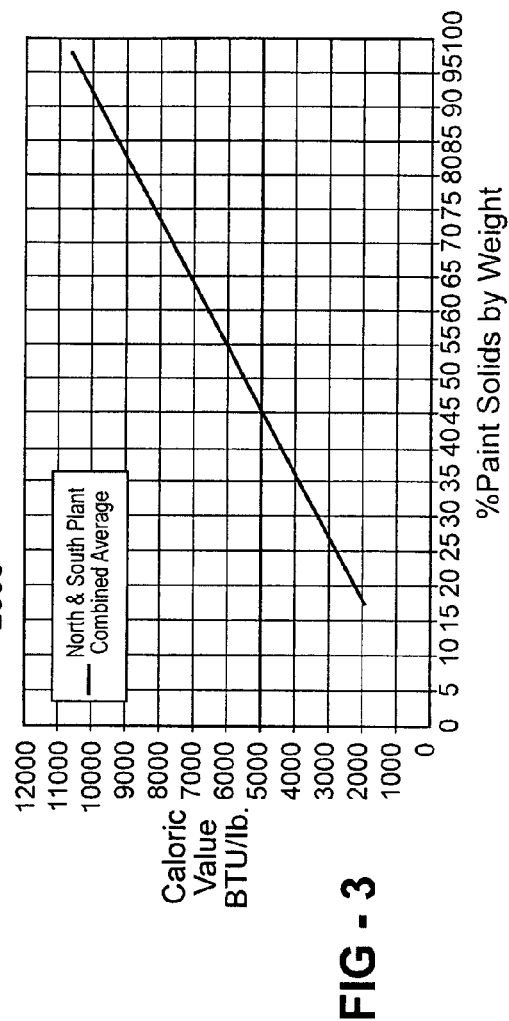
FIG. 3 is a graph of the caloric value of paint sludge verses the paint sludge's solids percentage.

To use the processed paint sludge of the present invention as a fuel in combustion fuel energy facilities, the processed paint sludge is mixed with a carbonaceous material such as coal, coal fines, coke, coke breeze, coke fines, revert materials and mixtures thereof, using any suitable mixing apparatus, including grinders. If desired, the treated or mixed carbonaceous materials can be in the form of individual particles, agglomerated particles, pelletized or briquetted materials, or any convenient form that can be fed into a combustion system such as a furnace, boiler, etc. The resulting mixture may be preheated prior to combustion, the preheating allows for some evaporative losses and results in an increase in fuel value. FIG. 3 is a graph of the caloric value of paint sludge verses the paint sludge's solids percentage. As seen from FIG. 3, when completely dry, paint sludge will generate more than 10,000 Btu/lb of fuel value.

For purposes of using the paint sludge as a fuel according to the present invention, the paint sludge should be sufficiently dried so as to have a desired caloric value. While a caloric value of at least 5,000 Btu/lb (from a paint sludge that is dried to have a solids content of about 50 weight percent) provides fuel product having significant energy for use in power and heat generating plants and facilities, a paint sludge having 40 to 50 weight percent solids and even 30 to 50 weight percent solids can be used as a fuel product or component according to the present invention so as to recover a lesser degree of energy (See FIG. 3). Likewise, a paint sludge that has been processed to have a solids content greater than 50 weight percent can provide a caloric value of greater than 5,000 Btu/lb.

The production of a fuel product according to the present invention is not specifically limited to dewatering paint sludge by decantation or mechanical means. In this regard, other methods of paint sludge drying such as the use of heat, electricity, etc. can achieve greater than 50 weight percent solids and create more combustion energy. However, these methods can present significant problems. In order to achieve the higher percentage solids, heat and energy (electricity and combustion fuel), is required. This results in a greatly increased capital and operating costs. Thermal drying also causes the release of pollution gasses (VOC's) which require additional permitting and pollution abatement equipment which further increase the maintenance and operating costs. During thermal drying, the material can become very unstable and the process can pose a significant safety risk.

In has been determined during the course of the present invention that drying the paint sludge so that it has above 50 weight percent solids may not be desirable as the paint sludge becomes increasingly sticky and/or plasticized and hard to handle. If the sludge is too sticky and/or plasticized, it becomes a difficult and unwanted handling problem for the end users. Accordingly, providing a paint sludge fuel product component that has up to 50 weight percent solids and mixing the paint sludge with coal followed by subsequent drying can avoid problems associated with trying to handle stickier, dryer paint sludge. Moreover, the additional residual water in the paint sludge will help assist in developing a more uniform mixing of the paint sludge with coal particles and help to more intimately contact the surface of the coal particles with paint sludge. If desired, the paint sludge can further be subjected to a particle reduction treatment such as a shear mixer or blender before being combined with coal, as smaller paint particles can be more intimately and uniformly mixed with the coal.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

What is claimed is:

1. A process of producing a combustible fuel from paint sludge which comprises the steps of:
   a) obtaining raw paint sludge from a painting facility;
   b) subjecting the raw paint sludge to a dewatering process to obtain a combustion fuel component that consists of a paint sludge having a solids content of up to about 50 weight percent, while avoiding the release of volatile organic compounds from the raw paint sludge in the combustion fuel component; and
   c) mixing the combustion fuel component from step b) with carbonaceous material to produce a combustible fuel.

2. A process of producing a combustible fuel from paint sludge according to claim 1, wherein the combustible fuel produced in step c) is further heated to evaporate additional water from the mixture.

3. A process of producing a combustible fuel from paint sludge according to claim 1, wherein step b) comprises at least one of filtration, filter pressing, centrifugation, decantation, distillation, extraction, freeze drying and fluidized bed drying.

4. A process of producing a combustible fuel from paint sludge according to claim 3, wherein step b) comprises decantation.

5. A process of producing a combustible fuel from paint sludge according to claim 1, wherein the raw paint sludge is chemically treated prior to step b).

6. A process of producing a combustible fuel from paint sludge according to claim 1, wherein step b) comprises at least two successive dewatering steps.

7. A process of producing a combustible fuel from paint sludge according to claim 2, wherein the solids content of the solids content after evaporation is greater than 50 weight percent.

8. A process of producing a combustible fuel from paint sludge according to claim 1, wherein the carbonaceous material comprises at least one of coal, coal fines, coke, coke breeze, coke fines and revert materials.

9. A process of producing a combustible fuel from paint sludge according to claim 1, wherein water removed from the paint sludge in step b) is recycled back to the painting facility.

10. A combustible fuel produced by:
    a) obtaining raw paint sludge from a painting facility;
    b) subjecting the raw paint sludge to a dewatering process to obtain a combustion fuel component that consists of a paint sludge having a solids content of up to about 50 weight percent, while avoiding the release of volatile organic compounds from the raw paint sludge in the combustion fuel component; and
    c) mixing the combustion fuel component from step b) with carbonaceous material to produce a combustible fuel.

11. A combustible fuel according to claim 10, wherein the combustible fuel produced in step c) is further heated to evaporate additional water from the mixture.

12. A combustible fuel according to claim 10, wherein step b) comprises at least one of filtration, filter pressing, centrifugation, decantation, distillation, extraction, freeze drying and fluidized bed drying.

13. A combustible fuel according to claim 12, wherein step b) comprises decantation.

14. A combustible fuel according to claim 10, wherein the raw paint sludge is chemically treated prior to step b).

15. A combustible fuel according to claim 10, wherein step b) comprises at least two successive dewatering steps.

16. A combustible fuel according to claim 11, wherein the solids content of the solids content after evaporation is greater than 50 weight percent.

17. A combustible fuel according to claim 10, wherein the carbonaceous material comprises at least one of coal, coal fines, coke, coke breeze, coke fines and revert materials.

18. A method of processing paint sludge which comprises:
    a) obtaining raw paint sludge from a painting facility;
    b) subjecting the raw paint sludge to a dewatering process to obtain a combustion fuel component that consists of a paint sludge having a solids content of up to about 50 weight percent, while avoiding the release of volatile organic compounds from the raw paint sludge in the combustion fuel component;
    c) mixing the combustion fuel component from step b) with carbonaceous material to produce a combustible fuel; and
    d) combusting the combustible fuel.

19. A method of processing paint sludge according to claim 18, wherein the combustible fuel produced in step c) is further heated to evaporate additional water from the mixture.

20. A method of processing paint sludge according to claim 18, wherein step d) is performed in one of a furnace or boiler.

* * * * *